(12) United States Patent
Govorkov et al.

(10) Patent No.: US 7,227,881 B2
(45) Date of Patent: Jun. 5, 2007

(54) MASTER OSCILLATOR—POWER AMPLIFIER EXCIMER LASER SYSTEM

(75) Inventors: Sergei V. Govorkov, Boca Raton, FL (US); Rainer Paetzel, Dransfeld (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 11/371,411

(22) Filed: Mar. 9, 2006

(65) Prior Publication Data
US 2006/0171439 A1 Aug. 3, 2006

Related U.S. Application Data

(62) Division of application No. 10/696,979, filed on Oct. 30, 2003, now abandoned.

(60) Provisional application No. 60/448,630, filed on Feb. 20, 2003, provisional application No. 60/434,695, filed on Dec. 18, 2002, provisional application No. 60/426,659, filed on Nov. 15, 2002, provisional application No. 60/424,186, filed on Nov. 5, 2002.

(51) Int. Cl.
*H01S 3/22* (2006.01)
(52) U.S. Cl. .......................... 372/57; 372/94
(58) Field of Classification Search ............ 372/57
See application file for complete search history.

(56) References Cited

U.S. PATENT DOCUMENTS

| | | | |
|---|---|---|---|
| 4,734,911 A * | 3/1988 | Bruesselbach | 372/21 |
| 5,559,815 A | 9/1996 | Berger et al. | 372/25 |
| 5,963,363 A | 10/1999 | Weston et al. | 359/345 |
| 6,173,000 B1 | 1/2001 | Balla | 372/57 |
| 6,243,406 B1 | 6/2001 | Heist et al. | 372/59 |
| 6,359,922 B1 | 3/2002 | Partlo et al. | 372/58 |
| 6,370,174 B1 | 4/2002 | Onkels et al. | 372/38.04 |
| 6,381,256 B1 | 4/2002 | Stamm et al. | 372/19 |
| 6,381,257 B1 | 4/2002 | Ershov et al. | 372/57 |

(Continued)

OTHER PUBLICATIONS

Hunt, J. T., Glaze, J. A., Simmons, W. W., Renard, P. A. . "Suppression of self focusing through low-pass spatial filtering and relay imaging". Applied Optics. vol. 17, No. 13. p. 2053-2057.*

(Continued)

*Primary Examiner*—Minsun Oh Harvey
*Assistant Examiner*—Tod T. Van Roy
(74) *Attorney, Agent, or Firm*—Stallman & Pollack LLP

(57) ABSTRACT

A Master Oscillator (MO)—Power Amplifier (PA) configuration (MOPA) can be used advantageously in an excimer laser system for micro-lithography applications, where semiconductor manufacturers demand powers of 40 W or more in order to support the throughput requirements of advanced lithography scanner systems. A MOPA-based laser system can provide both high pulse energies and high spectral purity. A MOPA system can utilize a multi-pass PA, as well as a special beam path capable of reducing the amount of ASE (Amplified Spontaneous Emission) and feedback to the MO. Lithography scanner optics are primarily fused silica, such that the peak pulse power must be kept low to avoid material compaction when a MOPA system is used with lithography applications. This conflict between the demand for high average power and the low peak power requirement of the pulsed excimer laser source can be resolved by using a novel beam path to generate a sufficiently long pulse length.

12 Claims, 13 Drawing Sheets

U.S. PATENT DOCUMENTS

| | | | |
|---|---|---|---|
| 6,510,170 B1* | 1/2003 | Ravnitzki et al. | 372/106 |
| 6,549,551 B2* | 4/2003 | Ness et al. | 372/38.07 |
| 6,556,600 B2* | 4/2003 | Sandstrom et al. | 372/25 |
| 6,567,450 B2 | 5/2003 | Myers et al. | 372/55 |
| 6,590,922 B2 | 7/2003 | Onkels et al. | 372/57 |
| 6,625,191 B2 | 9/2003 | Knowles et al. | 372/55 |
| 6,690,704 B2 | 2/2004 | Fallon et al. | 372/58 |
| 6,693,939 B2 | 2/2004 | Klene et al. | 372/58 |
| 6,704,339 B2 | 3/2004 | Lublin et al. | 372/57 |
| 6,987,790 B2 | 1/2006 | Govorkov et al. | 372/86 |
| 6,999,492 B2 | 2/2006 | von Bergmann et al. | 372/81 |
| 2002/0044586 A1 | 4/2002 | Myers et al. | 372/57 |
| 2002/0064202 A1 | 5/2002 | Sandstrom et al. | 372/55 |
| 2002/0071468 A1 | 6/2002 | Sandstrom et al. | 372/57 |
| 2002/0085606 A1 | 7/2002 | Ness et al. | 372/55 |
| 2002/0114370 A1* | 8/2002 | Onkels et al. | 372/55 |
| 2002/0154668 A1 | 10/2002 | Knowles et al. | 372/55 |
| 2002/0154671 A1 | 10/2002 | Knowles et al. | 372/57 |
| 2002/0186355 A1* | 12/2002 | Omura | 355/53 |
| 2002/0186739 A1 | 12/2002 | Sandstrom et al. | 372/55 |
| 2002/0191654 A1 | 12/2002 | Klene et al. | 372/25 |
| 2003/0012234 A1 | 1/2003 | Watson et al. | 372/25 |
| 2003/0031216 A1 | 2/2003 | Fallon et al. | 372/29.01 |
| 2003/0043876 A1 | 3/2003 | Lublin et al. | 372/55 |
| 2003/0091087 A1 | 5/2003 | Ershov et al. | 372/55 |
| 2003/0099269 A1 | 5/2003 | Ershov et al. | 372/55 |
| 2003/0138019 A1 | 7/2003 | Rylov et al. | 372/58 |
| 2003/0161373 A1* | 8/2003 | Kitatochi et al. | 372/55 |
| 2003/0219094 A1 | 11/2003 | Basting et al. | 378/34 |
| 2004/0022291 A1 | 2/2004 | Das et al. | 372/55 |
| 2004/0022293 A1 | 2/2004 | Rule et al. | 372/58 |
| 2004/0047385 A1 | 3/2004 | Knowles et al. | 372/55 |
| 2004/0057489 A1 | 3/2004 | Fallon et al. | 372/57 |
| 2004/0179571 A1 | 9/2004 | Govorkov et al. | 372/57 |
| 2004/0207853 A1 | 10/2004 | Govorkov et al. | 356/450 |
| 2004/0240507 A1 | 12/2004 | Govorkov et al. | 372/57 |
| 2005/0031004 A1 | 2/2005 | Basting et al. | 372/57 |

OTHER PUBLICATIONS

J.T. Hunt et al., "Suppression of self-focusing through low-pass spatial filtering and relay imaging," *Applied Optics*, vol. 17, No. 13, Jul. 1, 1978, pp. 2053-2057.

* cited by examiner

MASTER OSCILLATOR—POWER AMPLIFIER EXCIMER LASER SYSTEM

CLAIM OF PRIORITY

This patent application is a divisional of U.S. patent application Ser. No. 10/696,979, filed Oct. 30, 2003 now abandoned. This patent application claims priority to U.S. Provisional Patent Applications "MASTER OSCILLATOR—POWER AMPLIFIER EXCIMER LASER SYSTEM," No. 60/424,186, filed Nov. 5, 2002; "MOPA EXCIMER LASER SYSTEM," No. 60/426,659, filed Nov. 15, 2002; "EXCIMER LASER WITH INTEGRATED PULSE EXTENDER," No. 60/434,695, filed Dec. 18, 2002; and "MOPA EXCIMER LASER SYSTEM," No. 60/448,630, filed Feb. 20, 2003, all of which are incorporated herein by reference.

CROSS-REFERENCE TO RELATED APPLICATIONS

The following applications are cross-referenced and hereby incorporated herein by reference:

U.S. patent application Ser. No. 2002/0021729, entitled "NARROW BANDWIDTH OSCILLATOR-AMPLIFIER SYSTEM," to Klaus Vogler, filed Feb. 21, 2002; and U.S. Pat. No. 6,389,045 B1, entitled "OPTICAL PULSE STRETCHING AND SMOOTHING FOR ARF AND F2 LITHOGRAPHY EXCIMER LASERS," to Klaus Mann et al., filed Apr. 17, 2000.

TECHNICAL FIELD OF THE INVENTION

The present invention relates to systems and methods of optical decoupling useful in a Master Oscillator—Power Amplifier (MOPA) system, wherein the power amplifier can be configured as single-pass or multiple pass.

BACKGROUND

Semiconductor manufacturers are currently using deep ultraviolet (DUV) lithography tools based on KrF-excimer laser systems, operating at wavelengths around 248 nm, as well as ArF-excimer laser systems, which operate at around 193 nm. Vacuum UV (VUV) tools are based on $F_2$-laser systems operating at around 157 nm. These relatively short wavelengths are advantageous for photolithography applications because the critical dimension, which represents the smallest resolvable feature size that can be produced photolithographically, is proportional to the wavelength used to produce that feature. The use of smaller wavelengths can provide for the manufacture of smaller and faster microprocessors, as well as larger capacity DRAMs, in a smaller package. In addition to having smaller wavelengths, such lasers have a relatively high photon energy (i.e., 7.9 eV) which is readily absorbed by high band gap materials such as quartz, synthetic quartz ($SiO_2$), Teflon (PTFE), and silicone, among others. This absorption leads to excimer and molecular fluorine lasers having even greater potential in a wide variety of materials processing applications. Excimer and molecular fluorine lasers having higher energy, stability, and efficiency are being developed as lithographic exposure tools for producing very small structures as chip manufacturing proceeds into the 0.18 micron regime and beyond. The desire for such submicron features comes with a price, however, as there is a need for improved processing equipment capable of consistently and reliably generating such features. Further, as excimer laser systems are the next generation to be used for micro-lithography applications, the demand of semiconductor manufacturers for powers of 40 W or more to support throughput requirements leads to further complexity and expense.

DETAILED DESCRIPTION

Figure 1:
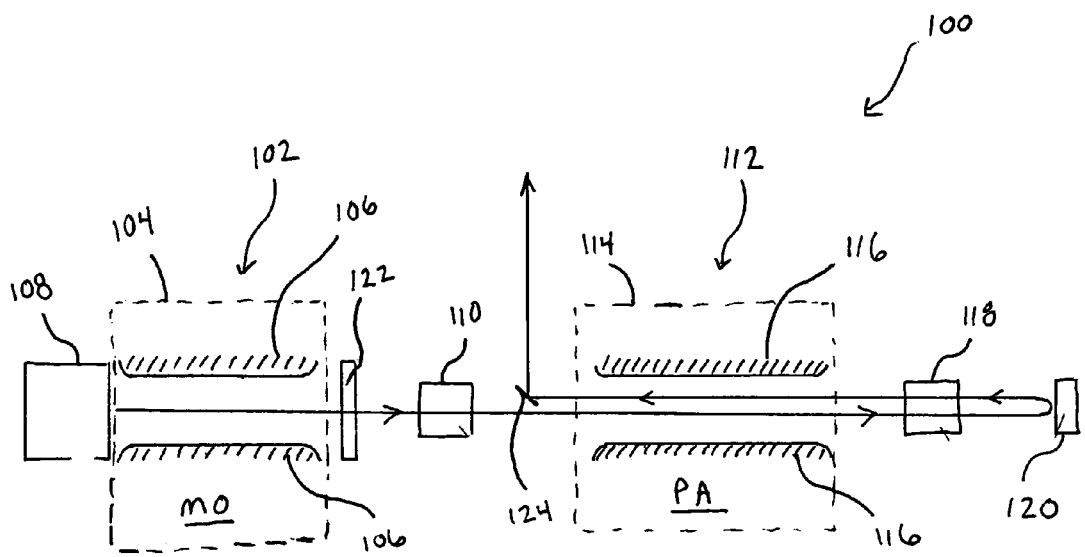
FIG. 1 is a diagram of a MOPA configuration that can be used in accordance with one embodiment of the present invention.

As semiconductor manufacturers move toward the production of chips with smaller sizes, the requirements on the processing and manufacturing equipment, including the laser light sources, are ever increasing. In laser systems used for photolithography applications, for example, it would be desirable to move toward higher repetition rates, increased energy stability and dose control, increased system uptime, narrower output emission bandwidths, improved wavelength and bandwidth accuracy, and improved compatibility with stepper/scanner imaging systems. It also would be desirable to provide lithography light sources that deliver high spectral purity and extreme power, but that also deliver a low cost chip production. Requirements of semiconductor manufacturers for higher power and tighter bandwidth can place excessive, and often competing, demands on current single-chamber-based light sources. Systems and methods in accordance with various embodiments of the present invention can overcome many of these obstacles by taking advantage of a dual-gas-discharge-chamber technology referred to herein as MOPA (Master Oscillator—Power Amplifier) technology. MOPA technology can be used to separate the bandwidth and power generators of a laser system, as well as to control each gas discharge chamber separately, such that both the required bandwidth and pulse energy parameters can be optimized. Using a master oscillator (MO), for example, an extremely tight spectrum can be generated for high-numerical-aperture lenses at low pulse energy. A power amplifier (PA), for example, can be used to intensify the light, in order to deliver the power levels necessary for the high throughput desired by the chip manufacturers. The MOPA concept can be used with any appropriate laser, such as KrF, ArF, and $F_2$-based lasers.

In certain embodiments of the present invention, additional advantages can be obtained by using a multi-pass power amplifier configuration with the various MOPA configurations. In a "multi-pass" amplifier configuration, an oscillator beam output from an oscillator makes at least two separate passes through the discharge chamber of the amplifier. The use of at least one additional pass can allow for an increase in gain, and can provide the ability to obtain a higher output pulse energy with a lower input pulse energy. Such a configuration can also be used to drive the PA into a state of saturation, thereby reducing pulse-to-pulse energy fluctuations and improving beam homogeneity. A multi-pass configuration also can allow the system to effectively "stretch" the amplified pulse, which can lead to a relaxed requirement of the synchronization precision and, therefore, greater pulse energy reproducibility.

Running an extremely high gain in a multi-pass amplifier can have some drawbacks, however, as there can be an increased level of amplified spontaneous emission (ASE) in the laser output. The high gain can also result in undesirable feedback to the MO. Therefore, certain embodiments provide for an optical decoupling between the PA and the MO, as well as between passes of a beam through the PA. By optically decoupling the PA and the MO, a high output pulse energy can be obtained with low energy fluctuations. Further, ASE can be suppressed to less than 0.1% of the total laser output.

FIG. 1 shows a generalized configuration 100 that can be used in accordance with one embodiment of the present invention. A master oscillator (MO) 102 is formed by a first discharge chamber 104 having disposed therein a pair of electrodes 106 on either side of the beam path through the MO. The MO further includes a line-narrowing optics module 108 for narrowing the oscillator beam in the discharge chamber 104, and an outcoupler module 122. Although not shown, it should be recognized by one of ordinary skill in the art that various other elements can be included in the oscillator which are not shown, such as output beam diagnostic tools, circuits for forming a discharge pulse, and electronic controls.

A power amplifier (PA) 112 can be positioned along the beam path a distance from the MO, such as a distance comparable to the pulse length in free space, or at least half of the pulse length. Such separation can cause any ASE from the PA to be delayed with respect to the initial stages of pulse formation in the MO, such that pulse formation is not disturbed. A spatial filter 110 can be located along the beam path between the MO and the PA, which can serve to further de-couple the MO and the PA, and which can modify the size of beam size as described herein. The PA can include a discharge chamber 114 containing at least one pair of electrodes 116 on either side of the beam path. Once the beam makes a first pass through the PA, the beam can pass through a second spatial filter 118 and be retro-reflected by a retro-reflector 120 for a second pass through the second spatial filter 118 and the PA 112. The beam is directed to the work piece via mirror 124. The retro-reflector 120 can be removed a distance from the PA, such as a distance that is equal to a portion of the pulse length. Such separation can help to increase the "time window" of amplification, resulting in the overall gain being less sensitive to the time jitter between successive discharges. In certain embodiments, the retro-reflector must be a distance of at least half the pulse length away from the MO. This separation ensures that photons originating in the oscillator and amplified in the PA, which pass through the spatial filters, will not be amplified in the MO, as they arrive after the inversion population has been depleted. The second spatial filter 118 serves to decouple successive passes of the beam through the PA, thereby reducing the amount of the ASE in the output beam. The spatial filters used can vary between embodiments, but generally can be any appropriate spatial filters, such as those formed by cylindrical lenses and slits. In certain embodiments, it may be less desirable to use commonly known spatial filters based on spherical lenses and pin-holes. In utilizing cylindrical lenses to form a spatial filter, a much lower intensity can be obtained at the focal point, the formation of a plasma can be avoided, and the lifetime of the slits can be greatly extended.

Spatial filters are well known in the art, and are commonly used for removing high-spatial frequency features from beams, as well as combining the functions of magnification and imaging. See, for example, J. T. Hunt, P. A. Renard, W. W. Simmons, Applied optics, vol. 16, p. 770 (1977) or J. T. Hunt, J. A. Glaze, W. W. Simmons, P. A. Renard Applied Optics, vol. 17, p. 2053 (1978). Such spatial filters consist of two spherical lenses, similar to that shown in FIG. 10, which form a focal point between the lenses. The pinhole is placed at the focal point, so that only the highly spatially coherent (low divergence) portion of the beam is transmitted. In certain embodiments, cylindrical lenses are used instead of commonly used spherical lenses, and a slit aperture is used instead of a pinhole. Since the beam is focused into a slit aperture instead of a pinhole, the intensity in the focal point can be reduced by orders of magnitude as.compared to a standard pinhole-based spatial filter. Thus, wear and damage to the slit aperture can be greatly reduced.

Figure 2:
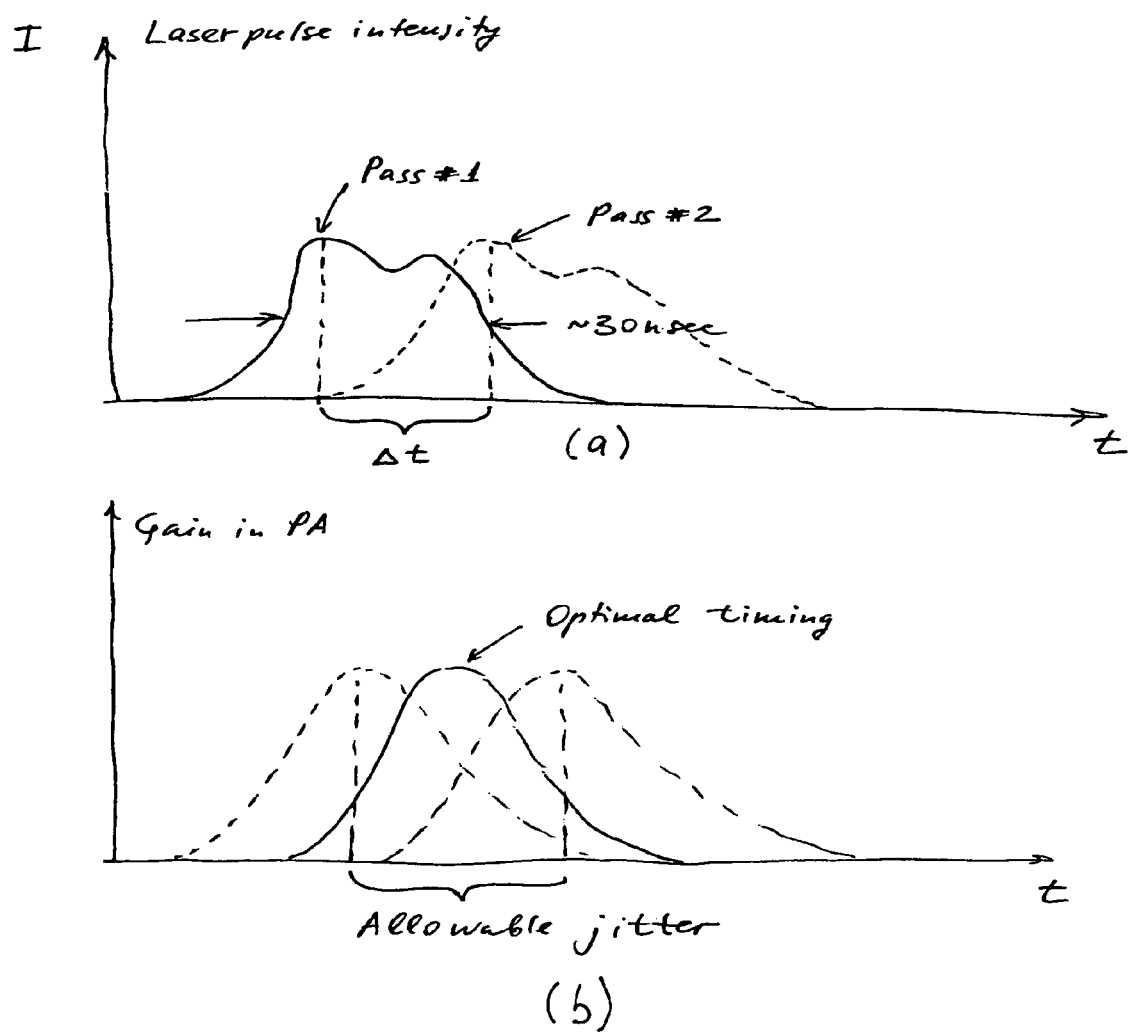
FIG. 2 is a plot showing (a) the intensity of a beam over subsequent passes through a PA, and (b) the allowable jitter over time in accordance with one embodiment.

As mentioned above, the use of a multi-pass amplifier configuration can allow the system to effectively "stretch" the amplified pulse, which can lead to greater pulse energy reproducibility. FIG. 2 illustrates one example of the effect of apparent pulse stretching in the amplifier, due to the time delay (Δt) between successive passes. FIG. 2(a) shows the intensity of laser light as a function of time for each pass through the amplifier, as "seen" by an observer at the amplifier. The solid waveform shows intensity originating from the laser pulse on the first pass through the amplifier, while the dashed curve shows the intensity of the second pass. The delay Δt between those curves is caused by propagation delay between the passes. FIG. 2(b) shows in the solid curve the gain in the PA as a function of time. The intensity of laser light is shown as a function of time, as "seen" by an observer at the amplifier. The solid waveform shows intensity originated from the laser pulse on the first pass through the amplifier, while the dashed curve is the intensity of the second pass. The delay Δt between those is caused by propagation delay between the passes. The bottom diagram shows in solid curve the optical gain in the amplifier as a function of time. The optimum amplification occurs when the laser pulse overlaps temporarily with the gain pulse. Since the laser pulse intensity is present in the amplifier for a duration longer than that of a single pass, the timing of the gain pulse can become less critical. In fact, the actual delay can deviate from the optimal value without dramatic effect on the output pulse energy and/or spectrum. The dashed line illustrates the position of the gain pulse with imperfect timing control. Even though timing of the gain pulse is varied over a certain range, the gain pulse still overlaps with the laser pulse.

Figure 3:
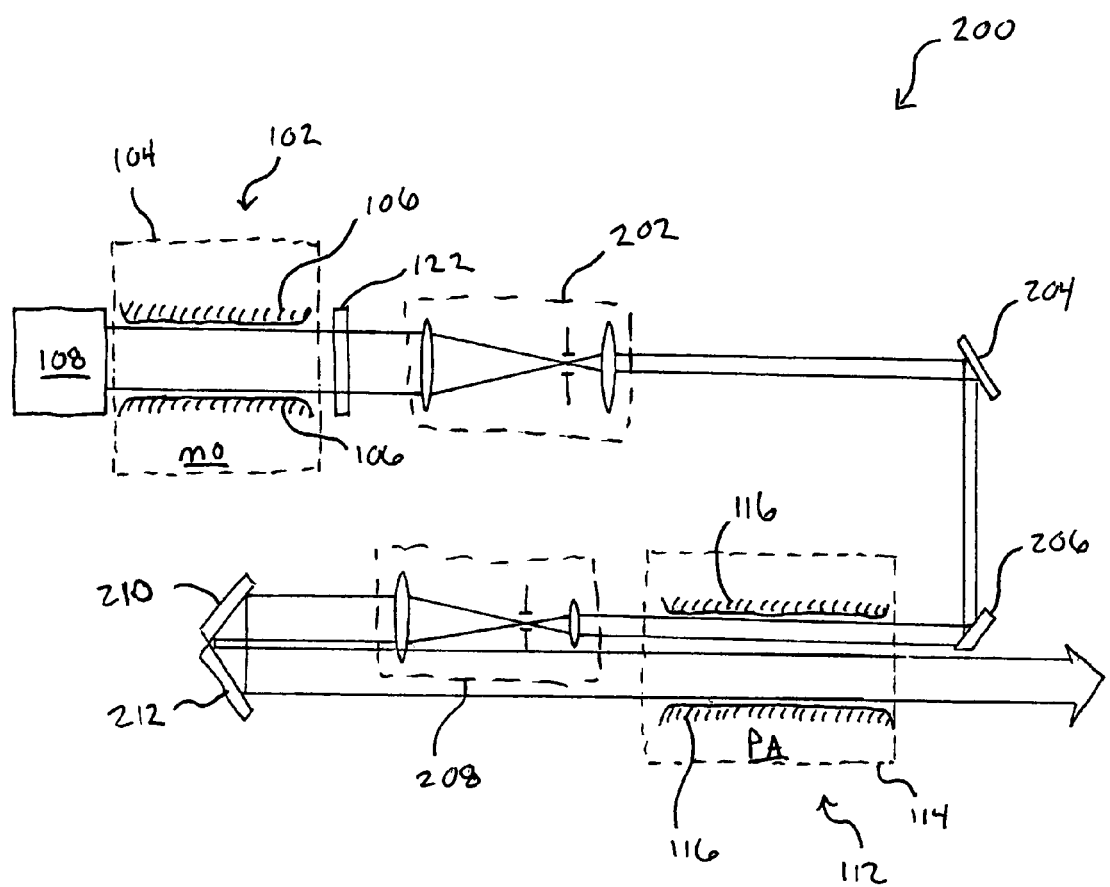
FIG. 3 is a diagram of another MOPA configuration that can be used in accordance with one embodiment of the present invention.

FIG. 3 shows a configuration in accordance with another embodiment of the present invention. Reference numbers are carried over between Figures where appropriate, for sake of simplicity. In this embodiment, the oscillator beam is reduced in size when passing through a first spatial filter and set of beam shaping optics 202. A pair of HR mirrors 204, 206 can be used to direct the beam such that the beam passes through the PA 112 in a direction substantially anti-parallel to the direction of the beam through the MO 102. On the first pass of the beam through the PA, the beam overlaps with only a small portion of the gain medium between the electrodes 116 in the discharge chamber 114. The energy of the pulse is insufficient to saturate the gain, such that partial overlap is not problematic. A second spatial filter and set of beam-shaping optics 208 is used to de-couple the beam between passes through the PA, as well as to expand the beam. The second spatial filter and set of beam-shaping optics 208 can be placed before or after the beam is again reflected using a pair of high reflector (HR) mirrors 210, 212. It should be understood that the HR mirrors are only exemplary, and that any appropriate optical device and or element can be used to appropriately redirect the beam. Also, while the beam path is shown being "folded" in the plane containing the discharge electrodes, or the "long" axis of the beam, a similar arrangement can be implemented using the "short" axis of the beam. When the beam passes through the PA a second time, stored energy is removed from the remaining volume of the gain medium in the discharge chamber 114. Further, expanding the beam can help to remove additional stored energy from the gain medium since the pulse energy will be greater on the second pass.

A power amplifier (PA) in some embodiments includes a discharge chamber filled with a laser gas, such as a gas including molecular fluorine, and a buffer gas. Electrodes are positioned in the discharge chamber that are connected to a discharge circuit, such as an electrical delay circuit, for energizing the molecular fluorine in the chamber. The discharge of the PA can be timed to be at, or near, a maximum in discharge current when a pulse from the master oscillator (MO) reaches the amplifier discharge chamber. An aperture can be positioned between the discharge chamber and the beam expander, as well as on the other side of the discharge chamber. Various line-narrowing optics can be used, which can include one or more tuned or tuneable etalons. In one embodiment, the one or more etalons are tuned for maximum transmissivity of a selected portion of the spectral distribution of the beam, and for relatively low transmissivity of outer portions of the spectral distribution of the beam. A prism beam expander can be provided before the etalons in order to expand the beam that is incident upon the etalon(s). Two etalons can be used and tuned, as is known in the art, such that only a single interference order of the beam is selected. The line-narrowing optics can further include a grating for selecting a single interference order of the etalon(s) corresponding to the selected portion of the spectral distribution of the beam. Instead of including an etalon, the line-narrowing optics may instead include only a beam expander and a diffraction grating. A beam expander in one such embodiment includes two, three, or even four VUV transparent prisms before the grating. The grating can have a highly reflective surface serving as a resonator reflector in addition to dispersing the beam.

The line-narrowing optics can include an etalon output coupler tuned for maximum reflectivity of a selected portion of the spectral distribution of the beam, and for relatively low reflectivity of outer portions of the spectral distribution of the beam. Such a system can also include optics such as a grating, dispersive prism, or etalon, which may follow a beam expander, for selecting a single interference order of the etalon output coupler. One or more apertures can be used for reducing stray light and divergence within the resonator of the PA.

In any layout or configuration in which a grating is utilized, a highly reflective mirror can be disposed after the grating, along the path of the beam, such that the grating and HR mirror form a Littman configuration. Alternatively, the grating can serve to retro-reflect as well as disperse the beam in a Littrow configuration. A transmission grating, or grism, can also be used.

A buffer gas used in a discharge chamber can include any appropriate gas, such as for example neon or helium, for pressurizing the gas mixture in order to increase the output energy for a given input energy. Sufficiently pressurizing the gas mixture can also work to increase the energy stability, gas and tube lifetime, and pulse duration. A laser system can further include a gas supply system for transferring molecular fluorine into discharge chamber, in order to replenish the molecular fluorine. A processor or processing device can be used with the gas supply system to control the molecular fluorine concentration within the discharge chamber, in order to maintain the molecular fluorine concentration within a predetermined range of optimum performance of the laser.

A spectral filter can be positioned between the master oscillator and the power amplifier for further narrowing the line width of the output beam of the oscillator. The spectral filter can include, for example, one or more etalons following a beam expander. Alternatively, the spectral filter can include a grating for dispersing and/or narrowing the beam. Where a grating is used, the spectral filter can include a lens to focus the beam through a slit and onto a collimating optic prior to impinging upon the beam expander-grating combination.

Components of a laser system can include those discussed in published U.S. Pat. application Ser. No. 2002/0021729, incorporated herein by reference above, which discloses a molecular fluorine ($F_2$) laser system including a seed oscillator and power amplifier. The seed oscillator comprises a laser tube including multiple electrodes therein, which are connected to a discharge circuit. Seed radiation can alternatively be provided by an excimer lamp maintained at low pressure. The laser tube is part of an optical resonator for generating a laser beam including a first line of multiple characteristic emission lines around 157 nm. The laser tube can be filled with a gas mixture including molecular fluorine and a buffer gas. The gas mixture can be at a pressure below that which results in the generation of a laser emission, including the first line around 157 nm having a natural line width of less than 0.5 pm, without an additional line-narrowing optical component for narrowing the first line. The power amplifier increases the power of the beam emitted by the seed oscillator to a desired power for applications processing.

Figure 4:
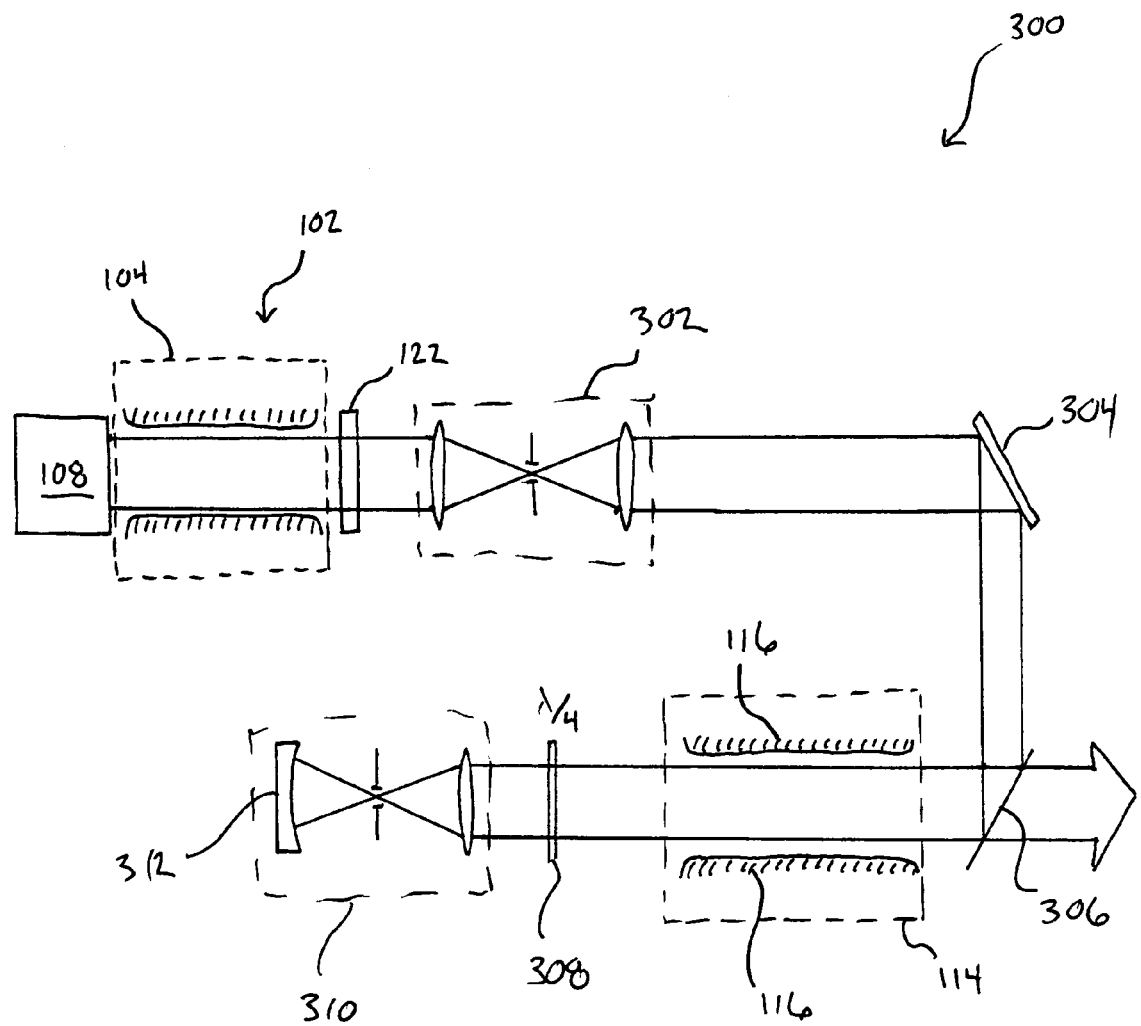
FIG. 4 is a diagram of another MOPA configuration that can be used in accordance with one embodiment of the present invention.

FIG. 4 shows another configuration 300 in accordance with embodiments of the present invention. In this layout 300, the beam again passes through a spatial filter and beam-shaping optics 302 after exiting the MO 102. The beam is then redirected approximately 90% by an HR mirror 304 to a polarizing element 306, which redirects the beam through the PA 112. After exiting the PA on the first pass, the beam passes through a quarter wave plate 308 that adjusts the polarization of the beam. The beam then passes through the second spatial filter and beam shaping optics 310 before, and after, being reflected by HR mirror 312. The reflected beam then passes again through the quarter wave plate 308 and makes a second pass through the PA. Even though the beam crosses the same area between the electrodes in the PA, the differing polarizations between passes prevents the passes from interfering with one another. After exiting the PA a second time, the beam passes through the polarizer 306 and exits the system. Due to the polarization of the beam exiting the PA, no portion of the beam will be redirected toward the MO by the polarizer 306, preventing ASE from interfering with the MO 102.

Figure 5:
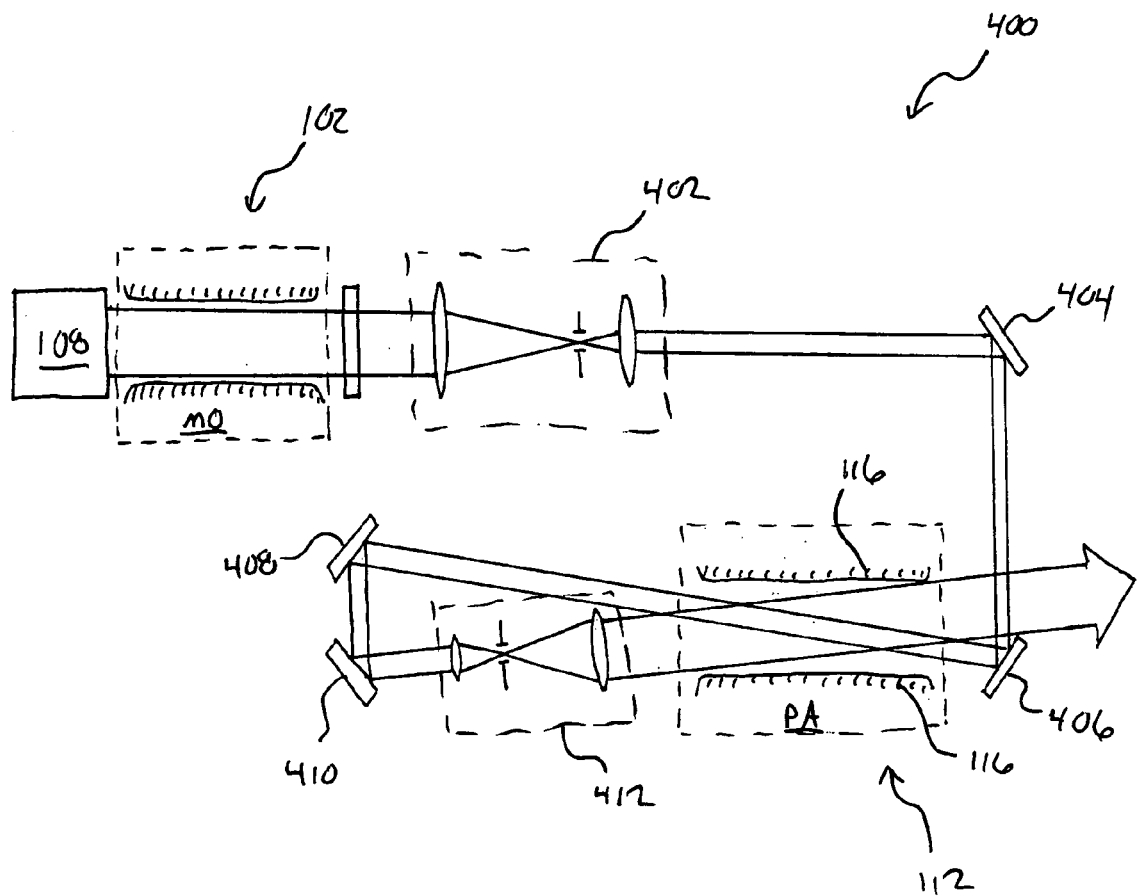
FIG. 5 is a diagram of another MOPA configuration that can be used in accordance with one embodiment of the present invention.

FIG. 5 shows a configuration 400 wherein the beam crosses through the PA 112 at a different angle for each pass, such as an angle of approximately 0.7°. After exiting the MO 102 and passing through the spatial filter and beam shaping optics 402, a narrowed beam is directed through the PA, using HR mirrors 404 and 406, at an angle that is substantially non-parallel to the long axis of the PA electrodes 116. The beam is then redirected by a pair of HR mirrors 408, 410 through a second spatial filter and beam shaping optics 412. The beam only passes through the second spatial filter after being redirected by HR mirrors 408 and 410, and the beam shaping optics function to widen the beam before the beam makes a second pass through the PA. The beam then makes a second pass through the PA, at another angle substantially non-parallel to the long axis of the PA electrodes before exiting the system. The differing angles and sizes of the beam between passes allows the passes to have minimum interference with one another, providing a cleaner separation of the "incoming" and "output" beams. In another embodiment, one of the passes of the beam through the PA can be made collinear to the chamber axis, or parallel to the long axis of the electrodes.

Beam Paths not Requiring Additional De-Coupling

Systems and methods in accordance with various embodiments of the present invention can do away with the need for additional optical coupling between the MO and PA in a MOPA-based excimer laser system by utilizing any of a number of special beam paths. Using a multi-pass configuration with a power amplifier (PA) can result in a higher level of ASE in the output and feedback to the master oscillator (MO). Feedback to the MO can originate from at least two sources, including ASE and a poorly decoupled, amplified main beam. The use of a special beam path can effectively reduce the amount of ASE and feedback, such that additional optical de-coupling is unnecessary.

In a relatively simple arrangement using a double-pass amplifier, a beam is retro-reflected back into the amplifier chamber after the first pass. Thus, the beam propagates towards the oscillator on the second pass. One difficulty with such an approach is that it can be difficult to "scrape off" the entire beam after the second pass and turn the beam towards the output of the system, as the divergence angle of an excimer laser beam can be quite high. A portion of the beam outside of the main beam cross-section can become amplified and return to the oscillator. Since this portion can have a high spatial and temporal coherence, it can be difficult to block this portion using spatial or spectral filters that otherwise can be used for de-coupling of the MO from PA. The feedback to the MO can manifest itself in another way, as the outcoupling mirror 510 of the MO and retro-reflecting mirrors of the PA effectively form a resonator, which can resonate a scattered portion of the beam in the PA. A "time delay decoupling" approach can be utilized, but the substantial space required for such an approach, such as at least 5 m of the beam path, may not be practical. Approaches in accordance with various embodiments can overcome these obstacles by ensuring that the amplified beam is always propagating in a direction away from the MO, thus preventing feedback to the MO. The ASE portion of feedback is not nearly as strong as the amplified beam, and does not cause substantial disturbance to the MO.

Certain embodiments also address the difficulty in decoupling the second pass, or any subsequent passes, from the first pass in the PA. While a spatial filter can be used between passes, such as described above, a spatial filter can require a substantial length of free propagation along the beam path. Further, folding a focused beam with mirrors may not be feasible or practical due to the high intensity of the beam. The difficulty of folding the beam within the spatial filter can lead to the minimal beam path length between passes being equal to two lengths of the spatial filter, due to retro-reflection. Besides increasing the space requirement, this extra beam path length generates an additional delay between the passes, which can lead to reduced temporal overlap with the gain pulse. It is therefore an advantage of certain embodiments to utilize the portion of the beam path between passes without adding a penalty due to an unnecessary increase in path length.

Figure 6:
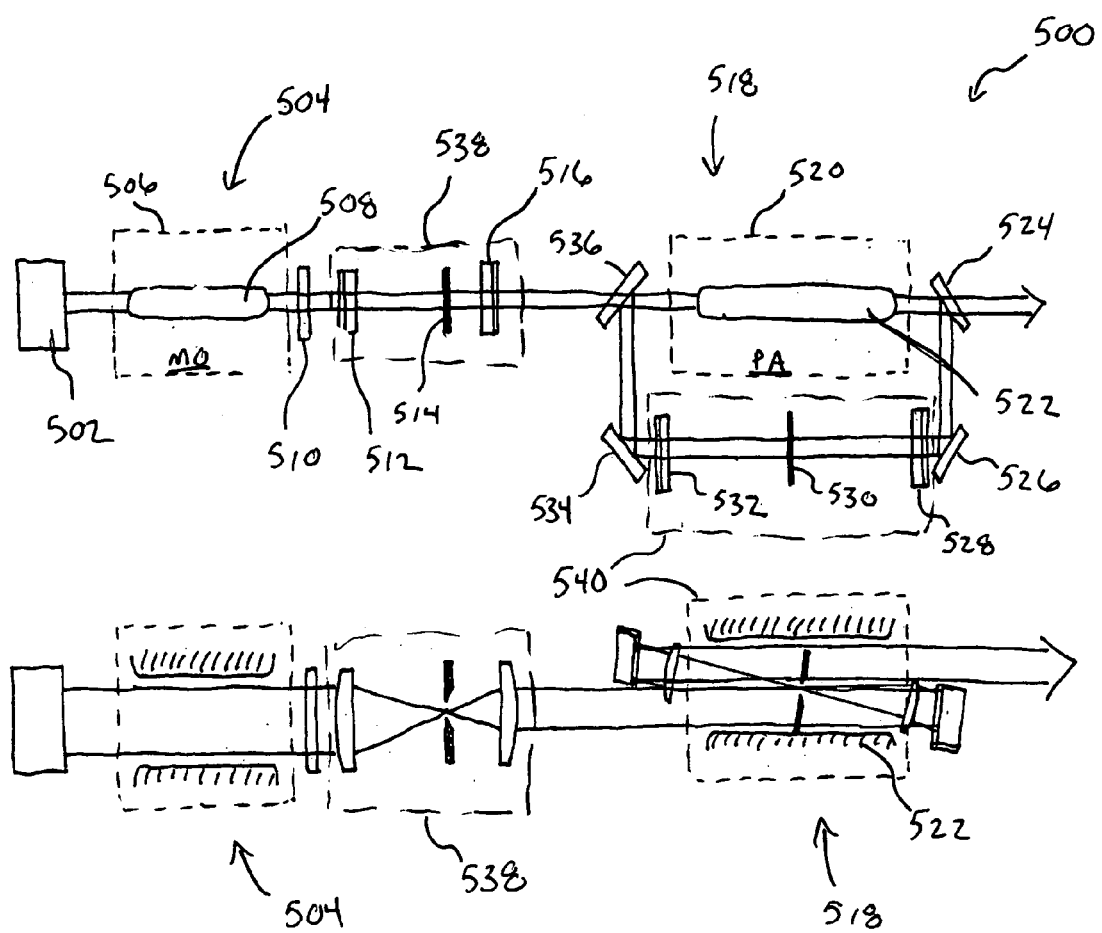
FIG. 6 is a diagram of another MOPA configuration that can be used in accordance with one embodiment of the present invention.

FIG. 6 shows a configuration 500 for one such embodiment, with the top portion of the Figure showing a top view of the embodiment and the bottom portion of the Figure showing a side view of the components. The master oscillator (MO) 504 in this layout includes a discharge chamber 506 containing at least one pair of electrodes 508, a line narrowing module 502, and an outcoupler 510. After a laser beam passes from the MO, the beam enters a first spatial filter 538 positioned between the MO 504 and the PA 518. The first spatial filter 538 in this embodiment consists of two cylindrical lenses 512 and 516, on either side of a slit 514 along the beam path. The orientation of the lenses and slit are shown in such a way that the slit is parallel to the "short" axis of the beam. It should be recognized by one of ordinary skill in the art that the lenses and slit of the spatial filter can also be oriented in a perpendicular direction. The decision on orientation can depend upon the resulting contrast ratio of the filter, or the ratio of the transmitted coherent portion of the beam to the transmitted spontaneous emission.

After passing through the first spatial filter 504, the beam traverses the gain volume between the electrodes 522 in the discharge chamber 520 of the power amplifier (PA) 518. After the first pass through the PA, the beam is folded by mirrors 524, 526, 534, and 536 such that the beam can make a second pass through the PA 518. As can be seen in the side view in FIG. 6 the beam height is a portion of the height of the gain area between the electrodes 522 in the chamber 520, such that the two passes can effectively be "stacked" between the electrodes. The beam height, which in this embodiment is less than or equal to one half of the height of the gain medium between the electrodes, can be adjusted by selecting lens 512 and lens 516 to be of unequal focal length. Thus, the beam size will be proportional to the focal length ratio of the two lenses (516/512). Alternatively, the second pass through the PA can be made with an expanded beam. The beam can be expanded by placing a second spatial filter 540 in the path of the beam between the first and second passes. Expansion can be made using a second spatial filter 540 by adjusting the ratio of focal length of lenses 528 and 532 on either side of slit 530. Alternatively, larger electrode spacing can be used in the amplifier than is used in the oscillator, such that the amplifier can accommodate both beams. It should be understood to one of ordinary skill in the art that embodiments are described using a double-pass configuration for simplicity, and that additional passes can be taken through a PA where such additional passes are advantageous. In certain instances, however, a double-pass configuration proves advantageous.

Certain advantages exist to such a beam path, as there is no retro-reflector or other optical element positioned so as to return the beam directly back into the amplifier for the second pass such that the beam is directed towards the oscillator. Despite precautions to cleanly separate a returned beam from the oncoming beam, there is typically a considerable divergence and scatter in either beam, which is inherent to the excimer lasers when a retro-reflector is used as such. Thus, a substantial portion of the amplified beam ends up going back into the oscillator and disturbing pulse formation. The returned portion of the beam can have a very high degree of collimation and spectral purity, making the beam difficult to filter out using a spatial or spectral filter. Using a beam path in accordance with embodiments of the present invention, however, allows the beam to always be propagating away from the oscillator, such that only ASE generated in the amplifier gain volume can reach the oscillator. If necessary, additional decoupling approaches can be used, such as the addition of spatial filters 538 and 540, which are otherwise optional, or the increasing of the distance between the MO 504 and the PA 520, such as to approximately ½ of the pulse length.

As shown in FIG. 6, a second spatial filter 540 for de-coupling subsequent passes through the PA can be conveniently inserted between mirrors 526 and 534. Such placement does not incur any penalty of extra beam path due to retro-reflection. In fact, the typical discharge chamber length is perfectly suitable for a conservatively-designed spatial filter. Lenses 528 and 532 comprising the second spatial filter 540 can be also inserted between mirrors 524 and 526, or between mirrors 534 and 536. The above discussion regarding the orientation of cylindrical axes of the lenses and the slit applies here as well.

Figure 7:
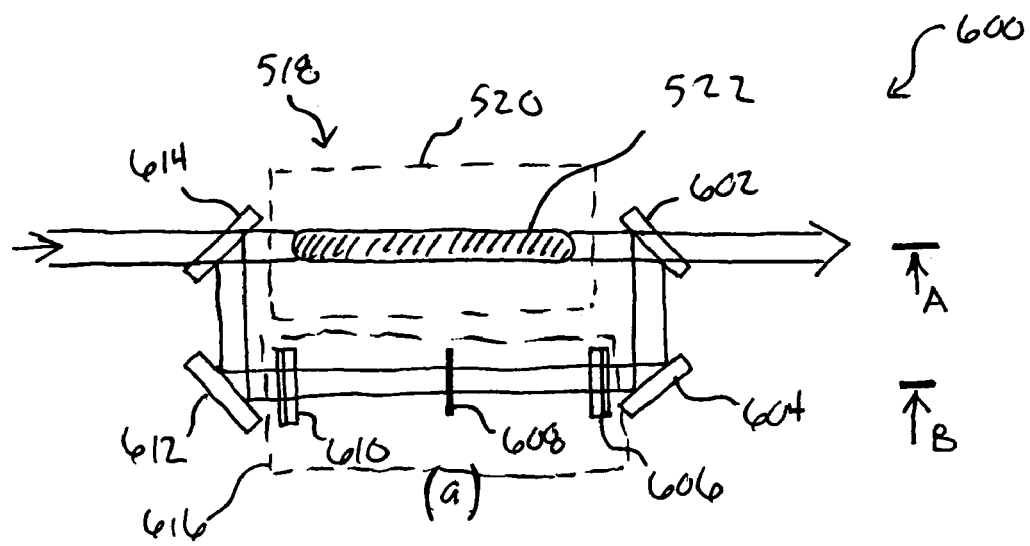
FIG. 7 is a diagram of a PA beam path that can be used in accordance with embodiments of the present invention.
Figure 7:
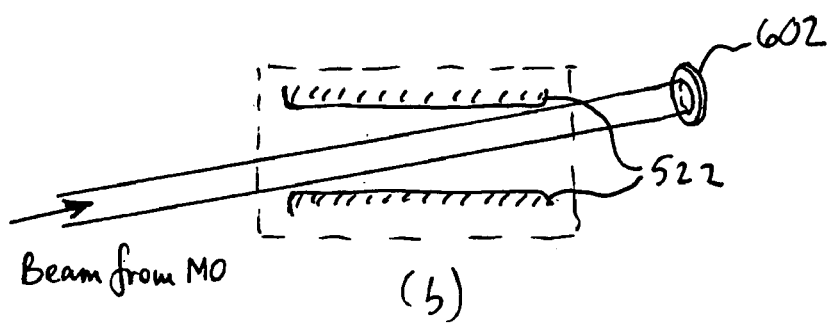
Figure 7:
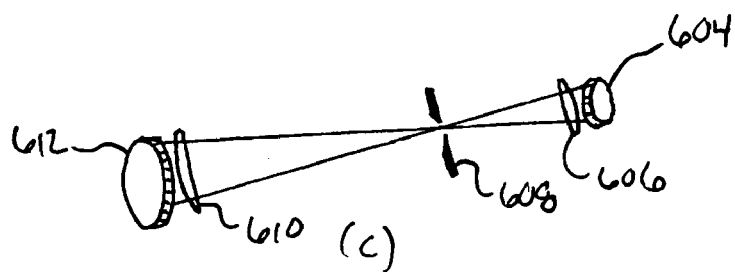
Figure 7:
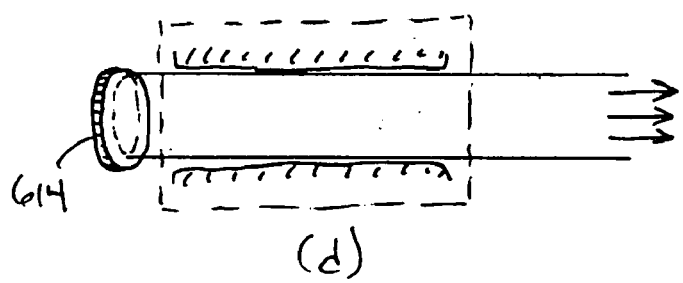

FIG. 7 shows a portion of a layout 600 in accordance with another embodiment of the present invention. The layout 600 is similar to the layout of FIG. 6 for the beam, until the beam first passes through the PA 518. FIG. 7(*a*) shows a top view of the amplifier portion of the layout, which is similar to the top view shown in FIG. 6. In the top view, it can be seen that the beam passes through the PA 518, then is redirected by mirrors 602 and 604 through second spatial filter 616 comprising lenses 606 and 610 and slit 608. After passing through the second spatial filter, the beam is redirected by mirrors 612 and 614 back through the PA. As can be seen in the side view of FIG. 7(*b*) for the first pass of the beam through the PA, the path of the beam is tilted relative to the long axis of the electrodes, or the main axis of the chamber. Generally, the beam width will be somewhat smaller than the gap between the electrodes 522 in order to avoid any clipping of the beam while passing through the PA. After being redirected by the mirrors 602 and 604, the beam passes the second spatial filter 616, as seen in FIG. 7(*c*), at which time the width of the beam can be increased to match the size of the electrode gap. The beam width can be increased in one embodiment by appropriately selecting the ratio of the focal lengths of lenses 606 and 610 (e.g., 610/608). Finally, the beam can be redirected by mirrors 612 and 614, such that the beam makes a second pass through the PA along a path that is substantially parallel to the chamber axis, as shown in FIG. 7(*d*). Even without spatial filters in such an exemplary configuration, much less ASE is produced, such as a reduction on the order of at least a factor of 10, while maintaining about 50 mJ of the amplified output with 0.4 mJ in the input. One advantage of such a configuration is that the beam size substantially matches the gain volume cross section on the final pass and, therefore, the maximum output pulse energy can be obtained. In some variations of such a configuration, tilting of the beam path can occur, for example, in the plane of electrodes or perpendicular to such a plane. In some embodiments, both the first and second passes can be tilted relative to the chamber axis. The lens axes and slit of the second spatial filter can be oriented in the plane of electrodes or perpendicular to such a plane. Also, the beam does not have to be expanded on the second pass.

Figure 8:
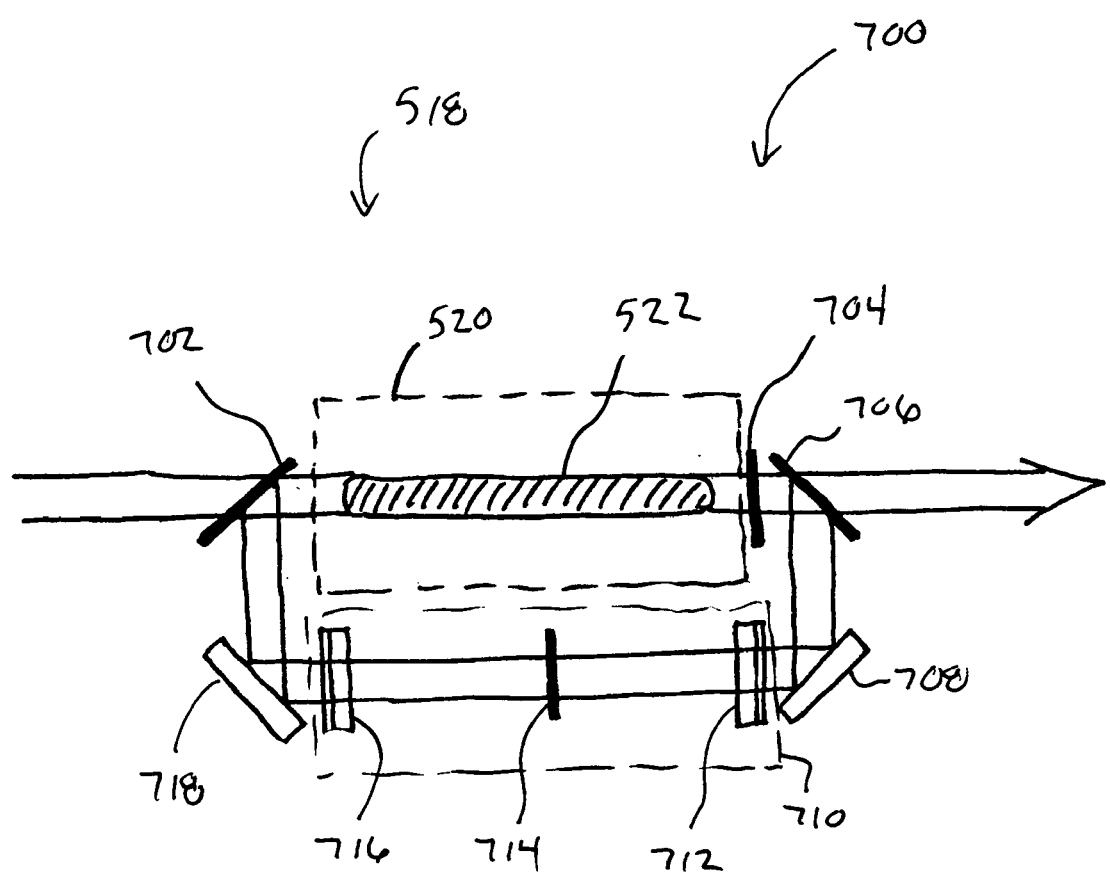
FIG. 8 is a diagram of another PA beam path that can be used in accordance with embodiments of the present invention.

FIG. 8 shows another variation 700 on the configuration of FIGS. 6 and/or 7. In this layout, the coupling of the beam to the amplifier is accomplished using polarizers 702 and 704. If the incoming beam is polarized in the plane of the Figure, for example, the beam can be transmitted through the first polarizer 702, make a first pass through the PA 518, and pass through a half-wave plate 704. The half-wave plate will change the polarization of the beam to a perpendicular polarization coming out of the Figure, which will then reflect off the second polarizer 706 and be redirected to mirror 708. The beam will pass through the second spatial filter 710, containing lenses 712 and 716, as well as slit 714, be redirected by mirror 718, and be reflected by the first polarizer 702. After the beam makes a second pass through the amplifier, half-wave plate 704 will change the polarization of the beam back into the plane of the Figure, such that the beam will pass through the second polarizer 706 and function as an output beam. The placement of the waveplate 704 placed between polarizers 702 and 706 can ensure that the polarization of the beam changes from in-plane "p" to the orthogonal "s" on the first pass through the amplifier 518, and from "s" to "p" on the second pass. Polarizers 702 and 706 can be highly transparent for a "p" polarized beam, guaranteeing that there are no oscillations in the apparent ring cavity formed by polarizers 702 and 706 and mirrors 708 and 718, because in either direction the beam is transmitted completely outside the "cavity." One advantage of such a configuration is that the beam size can match the gain medium cross-section on both passes. A potential disadvantage to such an approach, however, is that polarizers in the UV range can be expensive, can have relatively short lifetimes, and can have a low transmission and contrast ratio.

In the configurations of FIGS. 6-8 described above, either the first or second spatial filter, or both, can be omitted from the system. Whether or not to include the spatial filters can depend, for example, upon the severity of the ASE problem. Again, an inherent advantage of a beam path such as those shown in FIGS. 6-8 resides in the fact that the amplified beam does not propagate towards the oscillator, such that a major problem with feedback is resolved.

Further Variations

In certain embodiments, it can be advantageous to increase the output pulse length in order to, for example, reduce peak power in the optical components of the stepper. In order to increase the output pulse length, a layout similar to that shown in FIG. 8 can be used, but with a polarizer that is partially transmitting for "s" polarization and highly transmitting for "p" polarization. Having a high transmittance for "p" polarization can ensure the absence of oscillations in the loop or ring path for the PA. Due to the partial transmission of "s" polarization, a portion of the pulse energy after the first pass can be coupled out and added to the second-pass output pulse. Since the latter pulse is delayed with respect to the former, the resulting output pulse can be elongated.

One advantage to such a configuration is the prevention of oscillations in the ring cavity by the complete outcoupling of the beam after the two passes. Using a partially reflective mirror in place of a pair of polarizers may not be satisfactory, however, as there might always be feedback in the ring cavity. A disadvantage is that the output can consist of two components polarized in the orthogonal planes. In such a case, a "polarization scrambler" can be used in order to create a randomly polarized output beam. Another possibility is to insert a quarter-wave waveplate in the output beam, such that the output beam can be circularly polarized.

In another variation, a layout similar to that shown in FIG. 8 can be used, except that the first polarizer is replaced by a first partial reflector, the second polarizer is replaced by a second partial reflector, and the waveplate is removed. The product of the reflectivities of the first partial reflector and the second partial reflector must be small enough to not cause oscillations in the ring cavity formed by the partial reflectors and reflecting mirrors. At the same time, the total transmittance through the path formed by the sequence of second partial reflector, second mirror, third mirror, and first partial reflector has to be sufficient to create usable input for the second pass through the amplifier. A fundamental assumption in this approach is that the pulse evolution from the noise level in the ring cavity takes longer than the arrival time of the pulse from the oscillator, such that the output consists primarily of the amplified main pulse and not ASE. Using this assumption, the feedback does not necessarily have to be below the oscillation threshold in the absence of the main beam from the oscillator. One potential disadvantage to such an approach is the potential for an increased level of ASE.

In another approach, systems such as that shown in FIG. 8, and variations thereof as discussed above, can have the waveplate 704 placed between the first polarizer 702 and the discharge chamber 520, instead of between the chamber 520 and second polarizer 706. One advantage to such a configuration is that the intensity of radiation in the waveplate can be reduced. Brewster windows can be used to seal the chamber that are turned by 90 degrees, in order to minimize reflection losses on the second pass, which would be more "powerful" than the first pass.

Improved Amplification

Systems and methods in accordance with another embodiment of the present invention can provide improved amplification for an excimer laser using a MOPA configuration. A novel optical set-up can be used with the power amplifier in order to simultaneously achieve high amplification, low ASE, and extension of the temporal pulse. A follow-on optical pulse extension also can be used to reduce any unnecessary peak power.

An excimer laser in a MOPA configuration has the potential to meet the target performance requirements relating to the spectral purity and high average power necessary for micro-lithography applications. It is desired that such an excimer laser system deliver very high spectral purity, with low ASE background and a high average power of 40 W or more in order to support the throughput requirements of advanced lithography scanner systems. MOPA laser systems can generate a high pulse energy having high spectral purity. The optics in a scanner typical in lithography applications typically utilize fused silica as a primary material, requiring the peak power of the laser pulses to be kept low in order to avoid the compaction of the material. This requirement presents a general conflict between the high power demand and the low peak power requirement of the pulsed excimer laser source. In order to meet the requirement of a high average power and low peak power, a long pulse length can be desirable.

Systems and methods in accordance with one embodiment of the present invention utilize a novel optical set-up which provides for the extraction of high energy levels from the amplifier having a long pulse length, allowing a laser pulse with low peak power to be extracted. A loop or ring structure of the optical configuration allows energy to be extracted from the amplifier independent from the oscillator pulse length. Such an approach avoids feedback that could interfere with the oscillator, and avoids optical surfaces that could cause the emission of ASE from the amplifier. Such an approach allows a long pulse to be extracted from the amplifier, while a standard pulse length can be used with the oscillator. Obtaining such a long pulse length from the amplifier does away with the need for a follow-on optical pulse extension of the output pulse. Such an approach can replace the classical approach used for the injection seeding of laser systems. In the classical approach, a cassegrain telescope-type approach is used for the amplifier, whereby the seed pulse enters through a hole in the rear HR mirror. The HR mirror and the resulting high ASE cause this approach to be less than desirable, in addition to the fact that this system does not allow the pulse to be extended by the delay time of the ring.

Optical pulse extenders have been developed in order to extend the output pulse after leaving the laser system, as described in U.S. Pat. No. 6,389,045 B1 incorporated herein by reference above.

Figure 9:
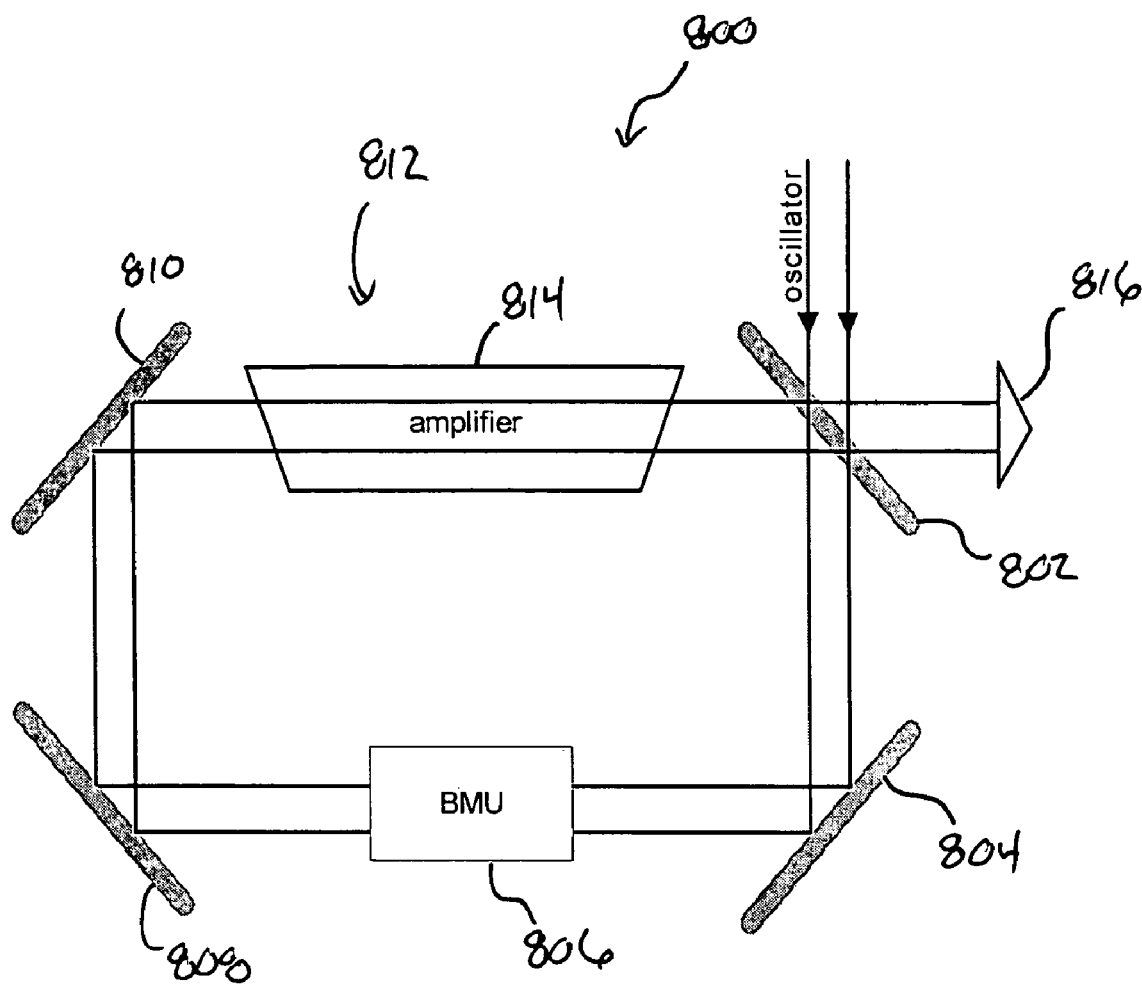
FIG. 9 is a diagram of another PA beam path that can be used in accordance with embodiments of the present invention.

FIG. 9 shows a configuration 800 creating a beam path that can be used in accordance with embodiments of the present invention, wherein a pulse extender is used as an integral part of the amplifier optics. In such a layout, the oscillator beam can be used to determine qualities of the laser beam, such as the wavelength, bandwidth, polarization, and direction. The first mirror 802 encountered by the beam coming from the MO can have a low reflectivity, such as on the order of 10% . . . 50%. The other mirrors 804, 808, 810 in the beam path can have a reflectivity close to 100% for the desired wavelength. The amplifier 812 schematically presents the amplification volume in the discharge chamber 814, which is pumped with timing corresponding to the oscillator beam. A beam-matching unit (BMU) 806 can be used, which represents optional optics that can be used to adapt the geometric beam size of the oscillator (not shown) to the amplifier 812. The BMU 806 can incorporate a spatial filter to ensure that only high purity laser radiation enters the amplifier.

When reaching mirror 802, a portion of the oscillator beam is directed towards the output 816 of the laser system. This portion of the beam can be used to probe, test, or monitor properties of the beam, such as by using another beam splitter to direct at least a portion of the beam to a diagnostic tool. The remaining portion of the oscillator beam can be steered via mirrors 804, 808, and 810 into the power amplifier 812. In the BMU 806, the beam can be adapted in size and/or spatially filtered. The oscillator beam can be amplified in the PA 812 if the oscillator and amplifier are properly timed. When reaching mirror 802, a small portion of the amplified beam can be directed towards mirror 804, and by way of mirrors 808 and 810 can re-enter the amplifier. The main portion of the beam passing through the amplifier can leave the laser system as output 816 through mirror 802, which acts as an out-coupling mirror. The re-directed portion can undergo a second amplification via a second pass through the amplifier 812, generating a second amplified pass which again splits off a portion at mirror 802 as output 816 and a portion that re-enters the amplifier 812. In this configuration, the output pulse length is determined by the pulse length over which efficient inversion can be reached in the amplifier. A high energy can be extracted while maintaining a low peak power, providing the opportunity to optimize the amplifier to account for amplification characteristics. The distance between the mirrors of this layout can be varied, and the total length of the ring formed by the mirrors can be adjusted such that a continuous pulse with minimum peak power is achieved.

Such a layout maintains the polarization of the incoming oscillator beam. The BMU can be utilized to achieve a high spectral purity for the portion of the beam passing through the amplifier volume. The BMU can consist of a telescope-like device to adapt the beam shape, and a spatial filter to ensure high spectral purity. An advantage to such a configuration is that no optical surface is capable of reflecting light back into the oscillator, ensuring sufficient optical isolation between the MO and PA, and avoiding interference between the two beams. The low reflectivity of mirror 802 reduces the intensity of ASE which could enter the amplifier by way of mirror 802.

Figure 10:
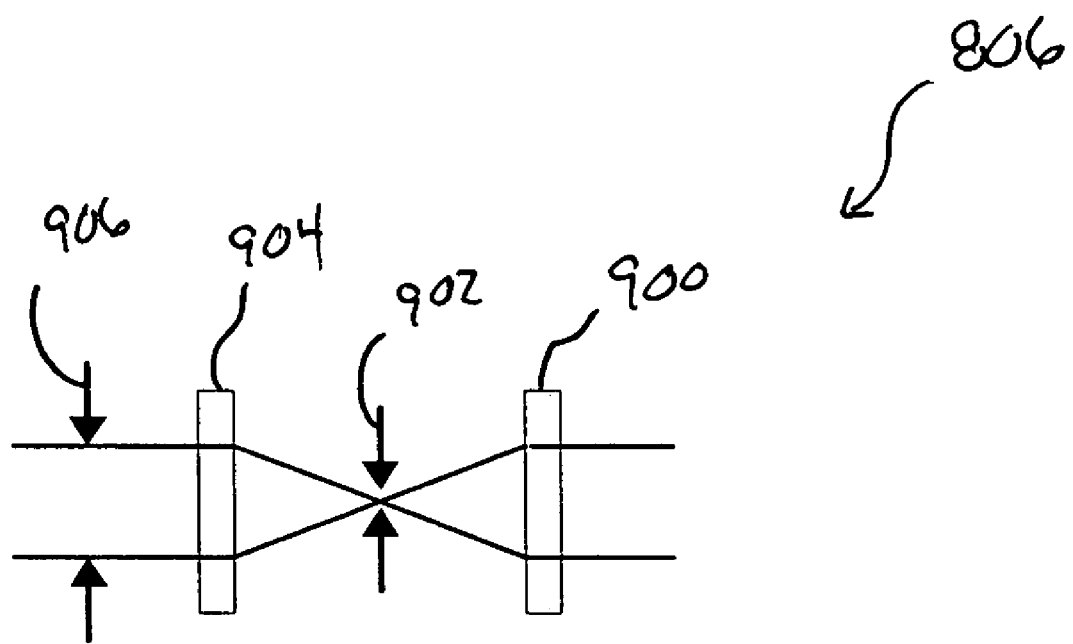
FIG. 10 is a diagram of a beam matching unit that can be used with embodiments of the present invention.

The optics used in the BMU 806 can be arranged such that spatial filtering is achieved for light traveling in both directions. FIG. 10 shows a schematic of an exemplary BMU 806, which consists of a two lens, positive branch telescope. A first aperture 902 is placed between the two lenses 900, 904. The first aperture 902 can be used to block the high divergent ASE at the focus point between the lenses. A second aperture 906, placed outside the lenses along the beam path, can be used to shape the beam in order to, for example, match the cross section of the amplifier volume. The timing of the amplifier can be adjusted such that the latter portion of the oscillator is used for amplification, whereas the start phase of the oscillator, which carries inferior spectral purity, does not receive amplification.

Figure 11:
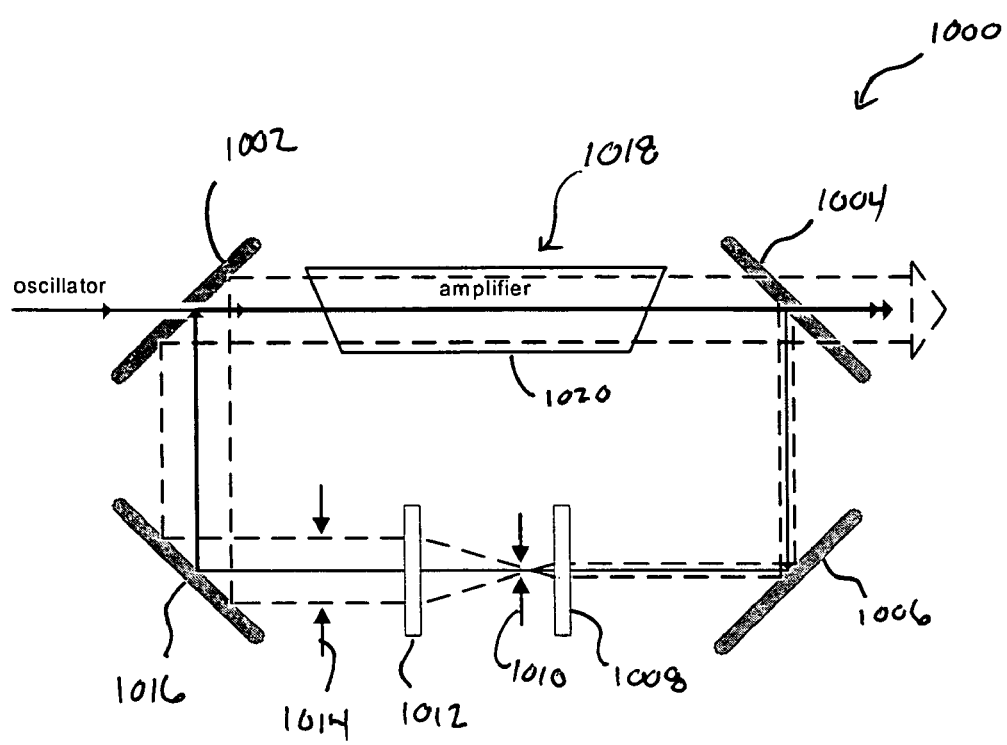
FIG. 11 is a diagram of another PA beam path that can be used in accordance with embodiments of the present invention.

FIG. 11 shows another configuration in accordance with embodiments of the present invention. A ring structure is shown, which can have behind it the same motivation as with the ring structure of FIG. 9. The layout of FIG. 11 is somewhat different, however, as another scheme is used for the injection seeding. In this layout 1000, the oscillator beam enters the ring structure through an appropriately-shaped hole in mirror 1002 and finds amplification in the volume of the discharge chamber 1020 of the PA 1018. A portion of the amplified beam is reflected by out-coupling mirror 1004, as well as high reflectors 1006, 1016, and 1002, back into the amplifier 1018. Lenses 1008 and 1012 can be used to adapt the size of the beam to fill the complete cross section of the amplifier volume for the second pass through the PA 1018. As described above, the lenses 1008, 1012 and apertures 1010, 1014 can be utilized for spatial filtering.

Figure 12:
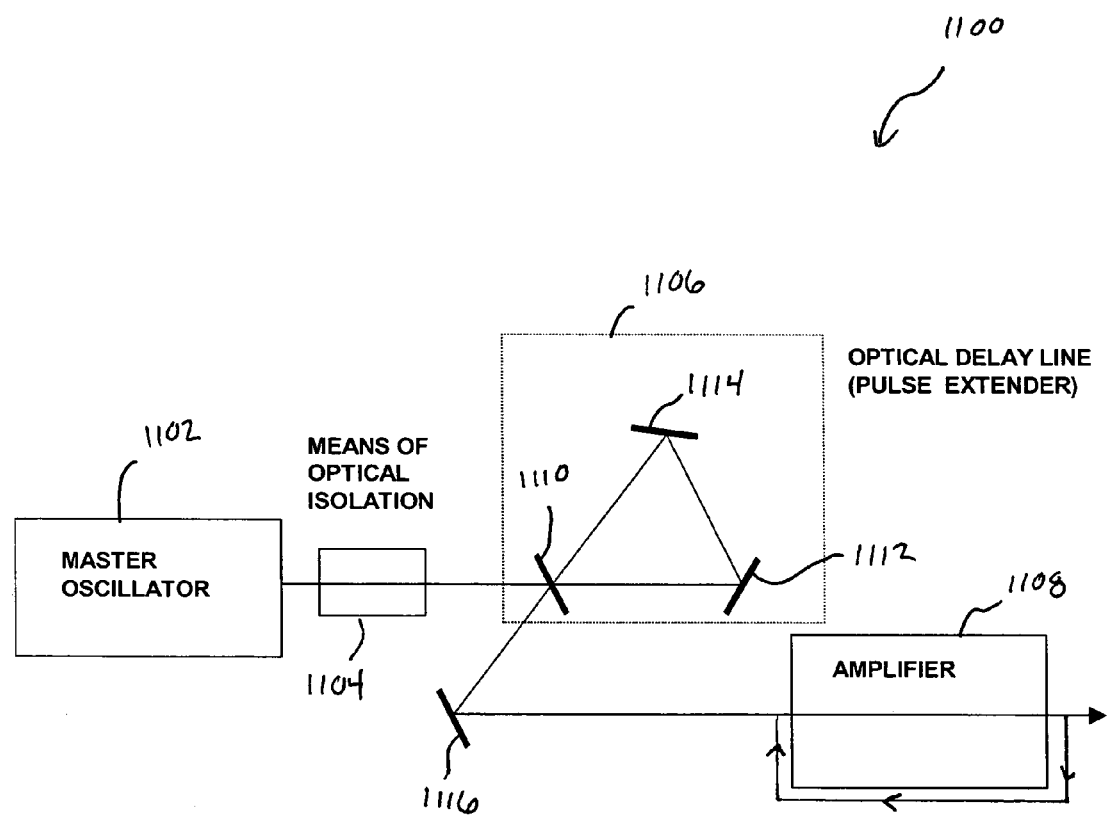
FIG. 12 is a diagram of a MOPA configuration having a pulse extender that can be used in accordance with one embodiment of the present invention.

FIG. 12 shows another such system 1100 where the MO 1102 is again separated by a means of optical isolation 1104, such as any of the optical isolation means described herein. In this layout, however, a pulse extender arrangement 1106 is inserted before the amplifier 1108 in order to reduced energy loss in the pulse extender. A pulse from the master oscillator 1102 will pass through the optional means of optical isolation, such as a spatial filter, and will be input to the pulse extender 1106, also known as an optical delay line. The pulse extender can include any appropriate optical elements, such as a beamsplitter 1110 and highly reflective mirrors 1112 and 1114. The beam splitter 1110 can reflect a portion of the incoming beam toward turning mirror 1116, and a portion of the incoming beam toward the delay line formed by mirrors 1112 and 1114. Upon the first round trip in the delay line 1106, the delayed pulse can be partially transmitted through the beam splitter 1110 so that the delayed beam overlaps spatially with the original partially reflected beam. The remaining portion of the delayed beam can be recirculated in the delay line. The delay line acts as a pulse extender, as all the output pulses of the delay line overlap spatially. This extended pulse can then be amplified in the amplifier 1108. This approach allows the length of the output pulse of a MOPA system to be increased, which can be beneficial for extending the lifetime of the optics in the optical scanner.

Using a single-pass amplifier with the above approach can provide an unnecessary limitation. In order to properly amplify longer pulses, the amplifier may need to have an equally long pulse gain. In a typical laser, making the gain pulse longer requires compromising other important parameters, such as the pulse energy stability. A multi-pass amplifier can avoid such limitations.

Figure 13:
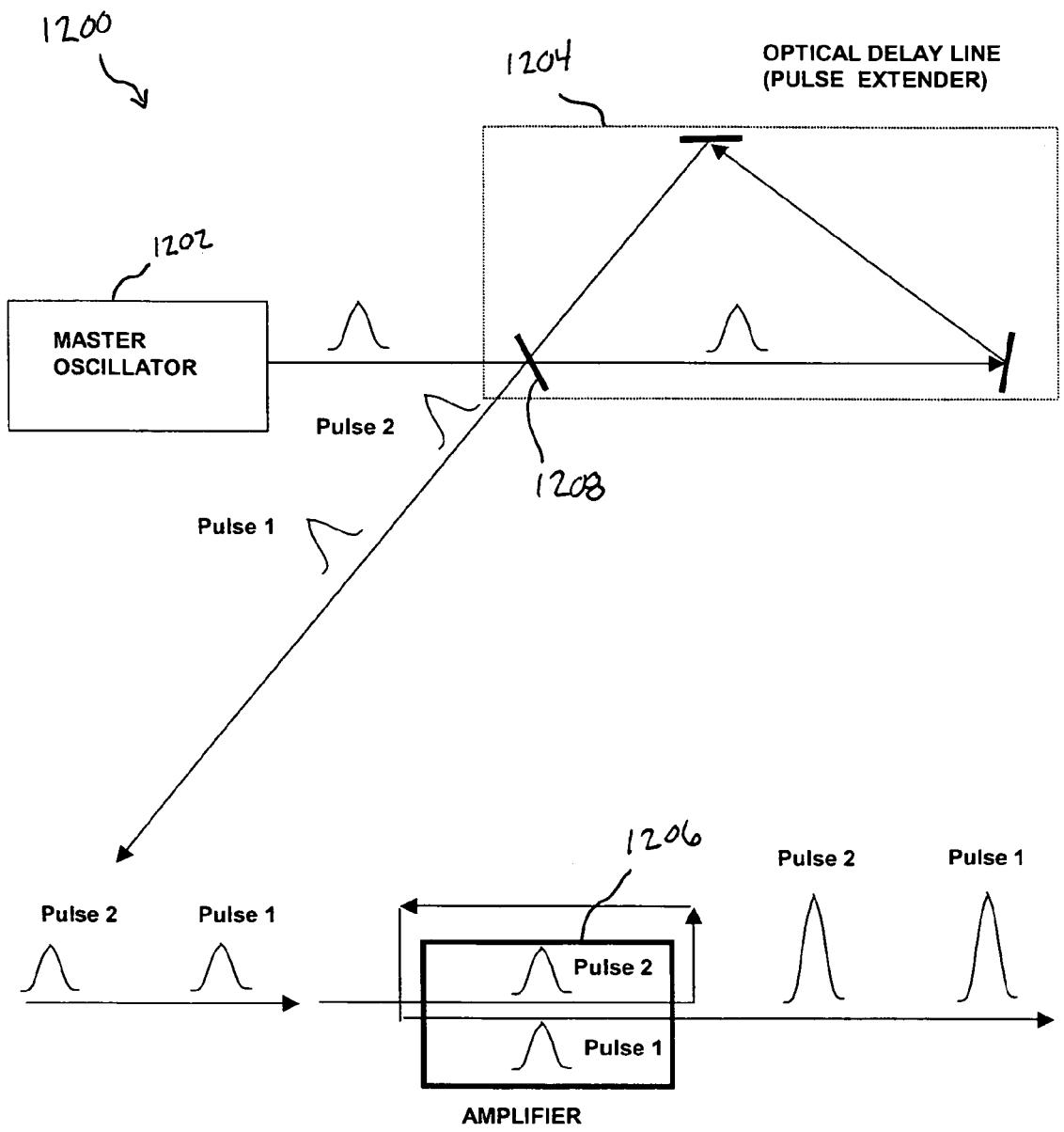
FIG. 13 is a diagram showing pulses along a beam path through a MOPA configuration in accordance with one embodiment of the present invention.

As shown in the layout 1200 of FIG. 13, the optical delay line 1204 essentially creates a sequence of two pulses of similar energy, followed by a series of much weaker pulses (not shown). The optimal reflectivity of the beam splitter 1208 used can be any appropriate value, such as for example approximately R=38%. This two-pulse sequence, can be treated effectively as a single pulse of increased duration. The delay between these pulse sequences, or pulse pairs, can be adjusted to correspond to the delay between consecutive passes in the amplifier 1206, shown schematically in FIG. 13. In order to appropriately adjust the pulses, each pulse can be present in the gain medium during the gain pulse. The pulses will both be present when a first pulse is present in the amplifier 1206 on a second pass, and a second pulse is present in the amplifier on a first pass. The output of such a system can then include the two amplified pulses. This approach differs from certain embodiments discussed above, in that the pulse extender is positioned between the oscillator and amplifier stages. Since the pulse extender always transmits only a percentage of the incoming pulse, the pulse extender consumes much less energy, in absolute terms, when positioned before the amplifier rather than following the amplifier along the beam path.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. An excimer or molecular fluorine laser system comprising:
    a master oscillator including therein a first discharge chamber filled with a first gas mixture, the first discharge chamber containing a plurality of electrodes connected to a discharge circuit for energizing the first gas mixture and generating a pulsed laser beam;

a power amplifier including therein a second discharge chamber filled with a second gas mixture, the second discharge chamber containing a plurality of electrodes connected to a discharge circuit for energizing the second gas mixture to define a gain region for amplifying the pulsed laser beam, said power amplifier having an entrance end and an exit end; and a set of reflective optics positioned about the power amplifier so that at least a portion of the pulse exiting the exit end of the power amplifier after a first pass therethrough is directed around the outside of the power amplifier and then redirected back into the entrance end thereby making a second pass through the power amplifier wherein the reflective optics includes a first reflector for intercepting the pulse exiting the power amplifier and a second reflector for redirecting the pulse back through the power amplifier, said first and second reflectors being configured and positioned so that the pulsed laser beam exiting the master oscillator bypasses the second reflector prior to entering the power amplifier for the first pass and bypasses the first reflector after making the second pass through the power amplifier, wherein the first pass propagates through a first portion of the gain region of the power amplifier and the second pass propagates through a second portion of the gain region of the power amplifier, said first and second portions being substantially different.

2. A laser system as recited in claim 1, wherein the first pass propagates through a first portion of the gain region of the power amplifier and wherein the beam is expanded after the first pass so that the second pass propagates through a larger portion of the gain region of the power amplifier.

3. A laser system as recited in claim 1, further including a spatial filter positioned so that the pulsed laser beam passes through the spatial filter after exiting from the exit end of the power amplifier and before entering the entrance end of the power amplifier on the second pass therethrough.

4. A laser system as recited in claim 1, wherein the master oscillator and the power amplifier are separated by at least one-half the length of a pulse.

5. An excimer or molecular fluorine laser system comprising:

a master oscillator including therein a first discharge chamber filled with a first gas mixture, the first discharge chamber containing a plurality of electrodes connected to a discharge circuit for energizing the first gas mixture and generating a pulsed laser beam;

a power amplifier including therein a second discharge chamber filled with a second gas mixture, the second discharge chamber containing a plurality of electrodes connected to a discharge circuit for energizing the second gas mixture to define a gain region for amplifying the pulsed laser beam, said power amplifier having an entrance end and an exit end; and a set of reflective optics positioned about the power amplifier so that at least a portion of the pulse exiting the exit end of the power amplifier after a first pass therethrough is directed around the outside of the power amplifier and then redirected back into the entrance end thereby making a second pass through the power amplifier and wherein the first pass propagates through a first portion of the gain region of the power amplifier and the second pass propagates through a second portion of the gain region of the power amplifier, said first and second portions being substantially different.

6. A laser system as recited in claim 5, wherein the reflective optics includes a first reflector for intercepting the pulse exiting the power amplifier and a second reflector for redirecting the pulse back through the power amplifier, said first and second reflectors being configured and positioned so that the pulsed laser beam exiting the master oscillator bypasses the second reflector prior to entering the power amplifier for the first pass and bypasses the first reflector after making the second pass through the power amplifier.

7. A laser system as recited in claim 5, further including a spatial filter positioned so that the pulsed laser beam passes through the spatial filter after exiting from the exit end of the power amplifier and before entering the entrance end of the power amplifier on the second pass therethrough.

8. A laser system as recited in claim 5, wherein the master oscillator and the power amplifier are separated by at least one-half the length of a pulse.

9. An excimer or molecular fluorine laser system comprising:

a master oscillator including therein a first discharge chamber filled with a first gas mixture, the first discharge chamber containing a plurality of electrodes connected to a discharge circuit for energizing the first gas mixture and generating a pulsed laser beam;

a power amplifier including therein a second discharge chamber filled with a second gas mixture, the second discharge chamber containing a plurality of electrodes connected to a discharge circuit for energizing the second gas mixture to define a gain region for amplifying the pulsed laser beam, said power amplifier having an entrance end and an exit end; and a set of reflective optics positioned about the power amplifier so that at least a portion of the pulse exiting the exit end of the power amplifier after a first pass therethrough is directed around the outside of the power amplifier and then redirected back into the entrance end thereby making a second pass through the power amplifier and wherein the first pass propagates through a first portion of the gain region of the power amplifier and wherein the beam is expanded after the first pass so that the second pass propagates through a larger portion of the gain region of the power amplifier.

10. A laser system as recited in claim 9, wherein the reflective optics includes a first reflector for intercepting the pulse exiting the power amplifier and a second reflector for redirecting the pulse back through the power amplifier, said first and second reflectors being configured and positioned so that the pulsed laser beam exiting the master oscillator bypasses the second reflector prior to entering the power amplifier for the first pass and bypasses the first reflector after making the second pass through the power amplifier.

11. A laser system as recited in claim 9, further including a spatial filter positioned so that the pulsed laser beam passes through the spatial filter after exiting from the exit end of the power amplifier and before entering the entrance end of the power amplifier on the second pass therethrough.

12. A laser system as recited in claim 9, wherein the master oscillator and the power amplifier are separated by at least one-half the length of a pulse.

* * * * *